3,282,677
METHOD OF MANUFACTURING IRON BY LOW TEMPERATURE REDUCTION WITH USE OF METHANE GAS
Magoichi Futakuchi, 20-banchi, Hayashi-cho, Bunkyo-ku, Tokyo, Japan, and Kanji Wada, Abeno-ku, Osaka, Japan; said Wada assignor to said Futakuchi
Filed Apr. 30, 1963, Ser. No. 276,910
7 Claims. (Cl. 75—34)

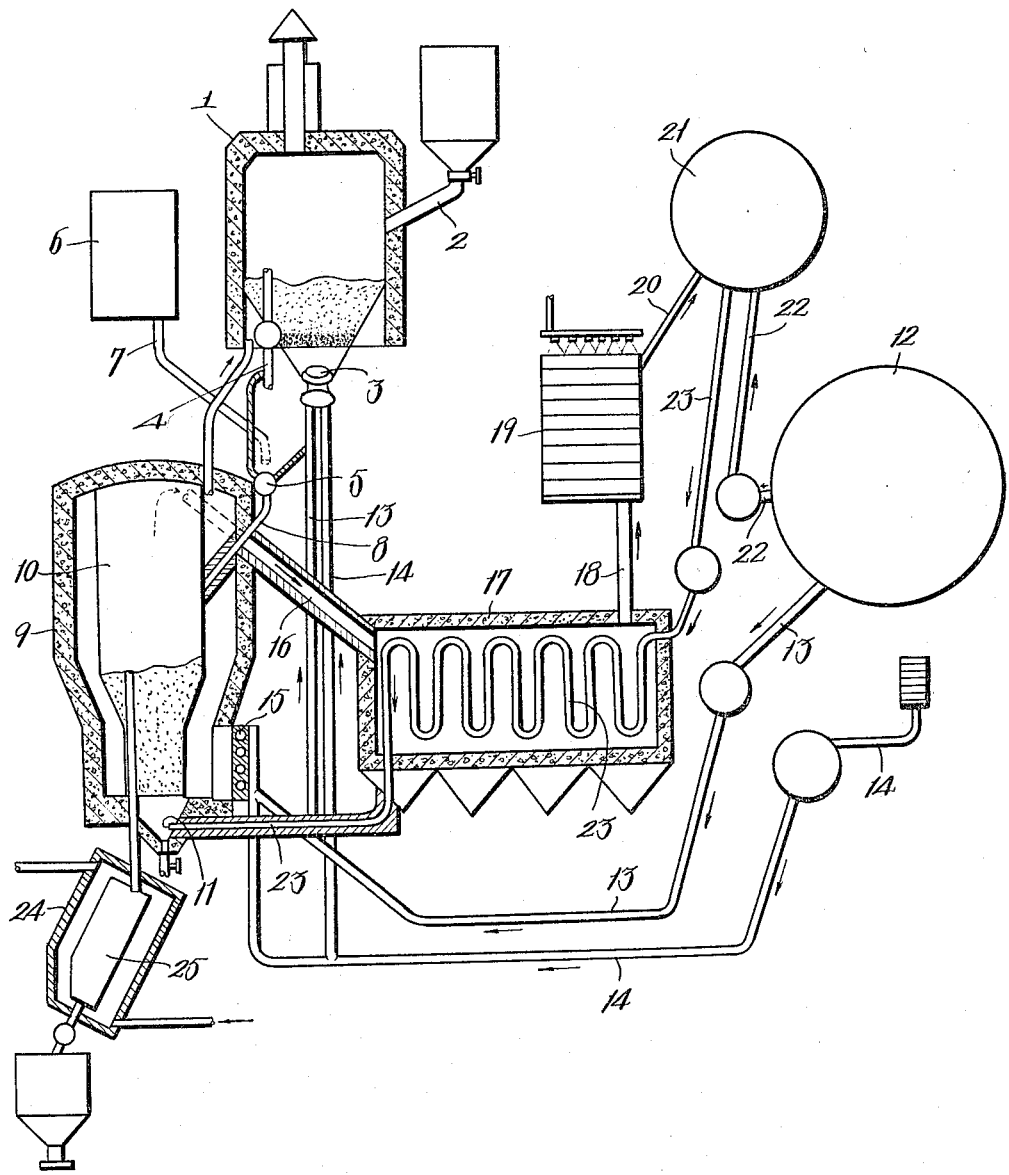

This invention relates to a method of manufacturing iron by low temperature reduction, in which methane gas is used as the source of reducing agent.

In manufacturing iron by the use of a fluidized reduction bed employing methane gas, various methods have been proposed for simultaneously effecting low temperature reduction at high speed and preventing in-furnace sintering. A number of such methods involve treating natural gas contained in the waste gas from petroleum refining or blast furnace operations to generate therefrom carbon monoxide and hydrogen gases which, in turn, are employed for reduction of iron ore. None of such procedures have, however, been commercially practiced, due to the fact that the process of generating carbon monoxide and hydrogen gases from methane is relatively complex and time-consuming, resulting in high costs. Moreover, when powdered iron ore or iron sand is subjected to fluidized treatment in hydrogen gas at 900° C., sintering begins to take place within 50 to 120 minutes after charging the materials to the furnace, resulting in coagulation and making it very difficult to remove the product from the furnace. Thus, the methane gas reduction process has heretofore been believed impracticable.

We have found that methane gas has a particular and peculiar action on cast iron chips or powder, or alumina, which materials are, according to the present invention, mixed into the powdered iron ore or iron sand to be reduced, in the form of pig iron chips from lathe cuttings, or bauxite, in the amount of from 3 to 5% by weight of the total quantity. In accordance with the invention, it has been found that methane gas introduced into the reduction furnace (maintained at a temperature of from 500° C. to 700° C.) produces, in the presence of the pig iron chips or bauxite, carbon monoxide and hydrogen gases at a high rate, which gases serve to reduce the iron ore or sand completely.

Accordingly, an object of the present invention is to provide an improved method of manufacturing iron by low temperature reduction, by the use of methane gas in the presence of cast iron chips or powder, or alumina.

Another object of the present invention is to provide an improved method of manufacturing iron by methane gas reduction at a low temperature, in the presence of pig iron chips from lathe cuttings or bauxite.

There are other objects and advantages of the present invention which will be made clear from the following detailed description of a preferred embodiment thereof, reference being had to the accompanying drawing, in which an apparatus for carrying out the present invention is diagrammatically shown.

Referring to the drawing, a baking furnace 1 is provided into which is charged iron sand from a feed reservoir through a feed pipe 2. The furnace is heated by a methane gas burner 3 disposed below the same, the iron sand fed into the furnace being heated to about 700° C. in the fluidized state in a manner well known in the art, whereby the iron sand is baked to remove sulfur and other impurities therefrom. The iron oxide thus produced is permitted to flow down through a pipe 4 to the inlet port 5 of a reduction furnace 10.

Pig iron chips from lathe cuttings are received in a tank 6, and fed to the reduction furnace inlet 5 through a pipe 7 at such a controlled rate that about 3 to 5% by weight of the pig iron chips are mixed with about 97 to 95% of the iron oxide from the baking furnace 1. The mixture flows through a conduit 8 into the reduction furnace 10 which is placed within a heating furnace 9 constructed with fire bricks. Methane gas under pressure for reduction purposes is fed into the lower end of the reduction furnace 10 through an inlet 11.

Methane gas under pressure is also received in a main tank 12, and is fed through a pipe 13 to a heating burner 15, to which is also supplied air through a pipe 14. The burner 15 is disposed in the lower end of heating furnace 9, and serves to heat the furnace to a temperature of about 500 to 700° C., at which the iron oxide powder in the reduction furnace 10 is satisfactorily reduced in the presence of the pig iron chips mixed therewith.

The methane gas that has been utilized in the reduction is discharged through a conduit 16 opening into the upper end of the reduction furnace 10. The methane gas thus discharged, being at a high temperature, is passed through a heat exchanger 17, and then through a pipe 18, a gas cooler 19, and a pipe 20 into a mixing tank 21. The gas cooler 19 is of the water cooled type, and any dusts contained in the methane gas cooled thereby are almost completely removed in the gas cooler.

Into the mixing tank 21 is supplied fresh methane gas from the main tank 12 through a pipe 22, and the enriched methane gas is fed to the furnace inlet 11 through a pipe 23 passing through the heat exchanger 17, the gas passing through pipe 23 being thus heated by the hot gases discharged from the reduction furnace.

A cooling water tank 24 is additionally provided below the furnace 9, having disposed therein an iron powder cooler 25 into which the reduced sponge iron drops from the reduction furnace 10 are fed to be cooled.

*Example 1*

3% by weight of pig iron chips were mixed into 10 tons of iron sand, and the mixture fed into the reduction furnace 10. Methane gas was supplied under pressure through the inlet 11, and the furnace temperature was raised to 650° C. by the gas burner 15. After about 15 minutes, carbon monoxide and hydrogen gases were produced, and after about two hours, approximately 95% of the iron sand had been reduced satisfactorily.

As a control, 10 tons of iron said without pig iron chips mixed therewith was fed into the reduction furnace 10 and subjected to the reduction process at the same 650° C. temperature. After two hours of the reduction process, only 5% of the iron sand was reduced.

*Example 2*

10 tons of iron sand with 3% of pig iron chips mixed therewith was subjected to the reduction process with the reduction furnace 10 heated to 700° C. After about 90 minutes, almost 95% of the iron sand had been reduced. 10 tons of iron sand without pig iron chips mixed therewith was subjected to the reduction process at the same 700° C. temperature, and only about 15% of the iron sand was reduced within 90 minutes.

In both Examples 1 and 2, the use of methane gas preheated in the heat exchanger 17 contributed about a 30% saving of the methane gas fuel consumed in the gas burner 15.

What we claim is:

1. A method of manufacturing iron by the low temperature reduction of iron ore in powder form, comprising mixing cast iron chips with said iron ore in an amount of from 3 to 5% by weight of the resulting mixture, and feeding the mixture into a reduction furnace heated to a temperature of 500 to 700 C., while supplying methane gas under pressure into said reduction furnace, to reduce said iron ore.

2. A method of manufacturing iron by the low temperature reduction of iron ore in powder form, comprising mixing bauxite with said iron ore in an amount of from 3 to 5% by weight of the resulting mixture, and feeding the mixture into a reduction furnace heated to a temperature of 500 to 700° C., while supplying methane gas under pressure into said reduction furnace, to reduce said iron ore.

3. The method according to claim 1, in which said iron ore is iron sand.

4. The method according to claim 3, in which said iron ore is iron sand.

5. The method according to claim 1, in which said cast iron chips are pig iron chips from lathe cuttings.

6. The method according to claim 1, including preheating said methane gas supplied to the reduction furnace by passing the same through a heat exchanger in heat exchange relation with the methane gas exhausted from said reduction furnace.

7. The method according to claim 1, including cooling and purifying the methane gas exhausted from said reduction furnace, mixing the cooled and purified methane gas with fresh methane gas, and recirculating the resulting mixture to said reduction furnace.

References Cited by the Examiner
UNITED STATES PATENTS

| | | | |
|---|---|---|---|
| 2,311,962 | 2/1943 | Payne | 266—14 |
| 2,475,607 | 7/1949 | Garbo | 75—26 |
| 2,485,945 | 10/1949 | Walker | 75—26 |
| 2,823,108 | 2/1958 | Gerlach | 75—33 |
| 2,880,083 | 3/1959 | Wienert | 75—33 |
| 2,931,720 | 4/1960 | De Vaney | 75—36 |
| 3,061,296 | 10/1962 | Ulmer | 266—14 |
| 3,079,248 | 2/1963 | Lewis | 75—26 |
| 3,168,386 | 2/1965 | Moritz et al. | 75—34 X |

DAVID L. RECK, *Primary Examiner.*

W. C. TOWNSEND, H. W. TARRING,
*Assistant Examiners.*